April 14, 1953 R. VOSS 2,634,939
SHAFT-ALIGNING MECHANISM
Filed July 2, 1949 2 SHEETS—SHEET 1
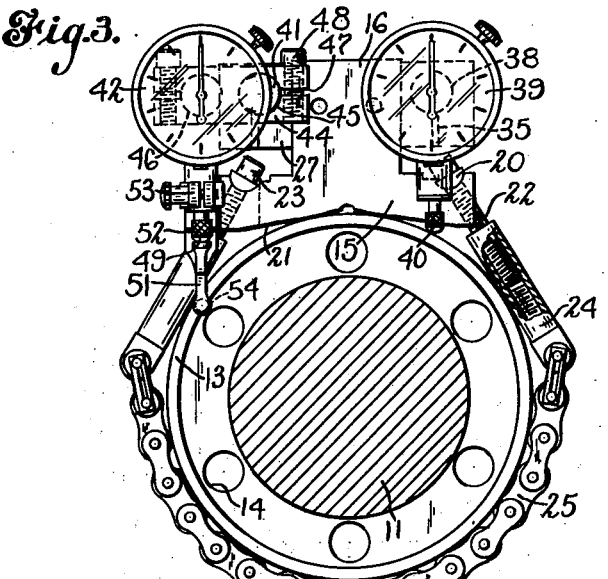
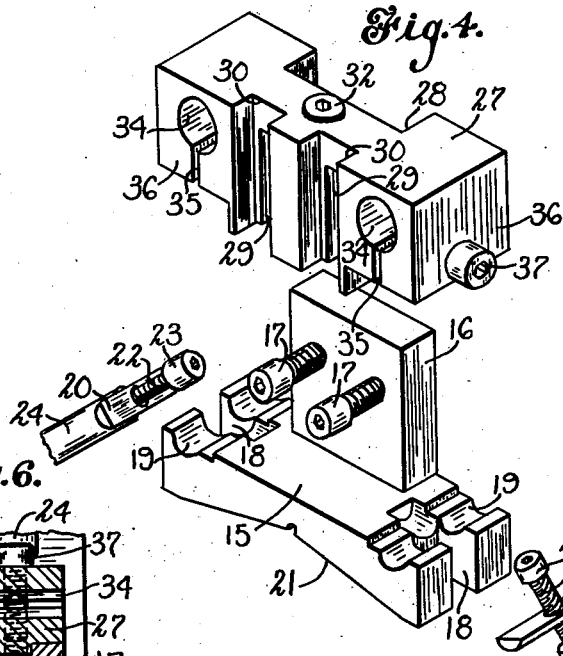
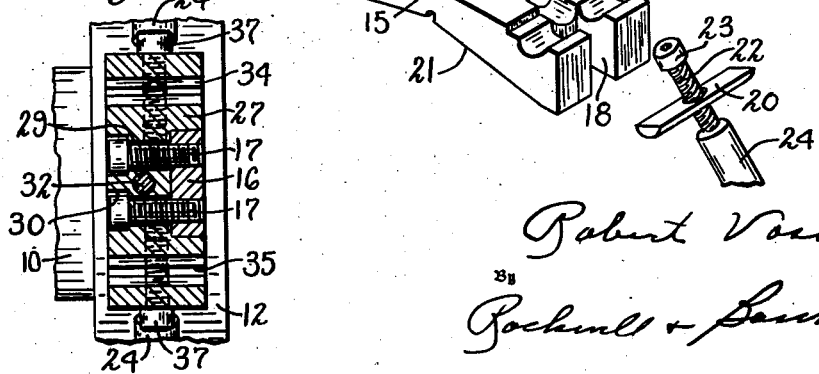
Inventor
Robert Voss
By
Rockwell & Santholm
Attorneys April 14, 1953 R. VOSS 2,634,939
SHAFT-ALIGNING MECHANISM
Filed July 2, 1949 2 SHEETS—SHEET 2

Inventor
Robert Voss
By
Rockwell & Leichatow
Attorneys

Patented Apr. 14, 1953

2,634,939

UNITED STATES PATENT OFFICE 2,634,939

SHAFT-ALIGNING MECHANISM

Robert Voss, East Haven, Conn.

Application July 2, 1949, Serial No. 102,750

4 Claims. (Cl. 248—231)

This invention relates to a shaft-aligning mechanism and more particularly to a device with which two sections of a shaft, for example may be tested for misalignment in a quick and economical manner.

It is very common to find shafts made in sections, particularly in heavy machinery, and these sections are coupled together to rotate as a unit. It is, of course, necessary that these shaft sections be in proper alignment so that the axis of one will coincide with the axis of the other.

Such shaft sections may be out of alignment in several ways. For example, the axes of the shaft sections may be parallel but one may be offset with respect to the other, a condition which is sometimes referred to as "offset misalignment." Also, the axis of one shaft may make a slight angle with the axis of the other shaft although the axes may be in the same plane, a condition which is referred to as "angular misalignment." Again there may be a combination of both angular and offset misalignment, and, in any case, correction should be made if proper operation of the shaft is to be secured.

It is contemplated by the present invention to provide a fixture or support which may be readily secured to one shaft section, the support carrying indicators or feelers which may be adjusted to rest upon the surface of the cooperating shaft section. In the form of my invention illustrated in the drawings, I have shown a support upon one shaft section provided with two dial indicators, each having a plunger or stem, one of the indicators being adapted to follow the periphery of the other shaft section or the periphery of a flange thereon, and the stem of the other indicator being adapted to follow the face surface of the second shaft section or the flange thereon if it is provided with a flange.

By using two dial indicators and by having them so mounted upon the support that they may be set to properly adjusted positions, the user may, as will be hereinafter explained, by rotating the shaft sections correct any misalignment of those sections, regardless of its character, in one operation.

In using my mechanism, the two shaft sections are rotated together, thus eliminating any errors which might arise due to irregularities in the surfaces of the shafts or flanges thereon. In this way the stems or plungers of the gauges are always kept in contact with the same point on the surface of the shaft, or a flange thereon, and thus even if there may be irregularities in the shaft itself, or even if the shaft or flange is out of round, such irregularities will not affect the accuracy of the results.

One object of my invention is to provide an improved mechanism for testing the misalignment of shaft sections or the like.

Another object of the invention is to provide an improved mechanism which may be readily applied to mating sections of shafts or the like and the misalignment of such shaft sections may be readily and easily detected regardless of the nature of such misalignment.

A still further object of the invention is to provide a mechanism for detecting the misalignment of shaft sections or the like, which mechanism will be provided with dial indicators adapted to engage portions of the surface of one of the sections, these indicators being so supported that they may be readily adjusted in a plurality of directions so as to make proper contact with the shaft surfaces with which they are to be engaged.

To these and other ends the invention consists in the novel features and combinations of parts to be hereinafter described and claimed.

In the accompanying drawings:

Fig. 3 is a sectional view on line 3—3 of Fig. 1;

Fig. 4 is an exploded perspective view of the parts of the clamping and supporting mechanism;

Fig. 6 is a sectional view on line 6—6 of Fig. 5.

Figure 1:
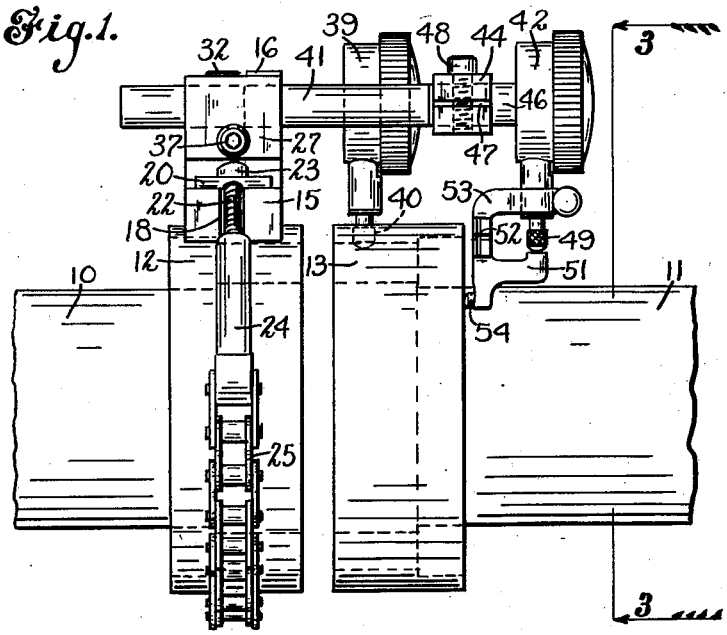
Fig. 1 is a side elevational view of my shaft-aligning mechanism applied to two cooperating shaft sections.
Figure 2:
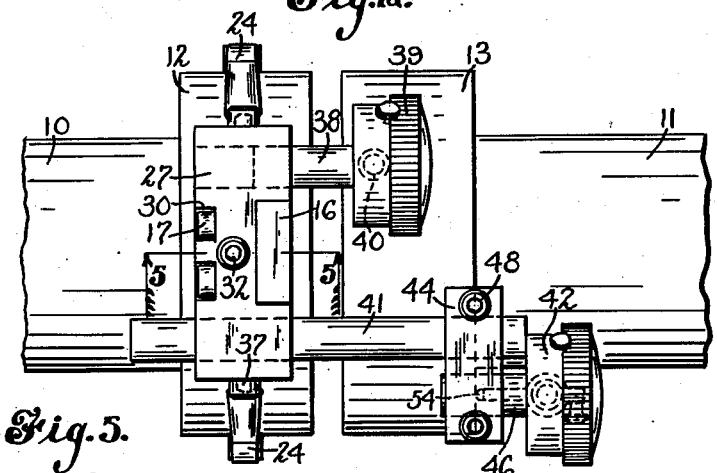
Fig. 2 is a top plan view of the parts shown in Fig. 1.
Figure 5:
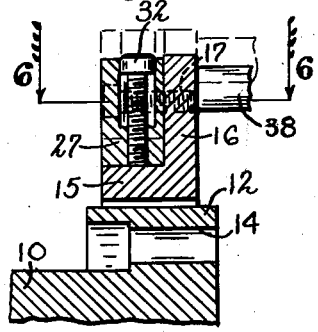
Fig. 5 is a sectional view on line 5—5 of Fig. 2.

To illustrate one embodiment of my invention and one method of using the same, I have shown in the drawings a pair of shaft sections 10 and 11 which are adapted to be coupled together and which are provided with flanges 12 and 13 provided with bolt openings 14 (Fig. 3). It will be understood, however, that the use of my device is not limited to the alignment of shaft sections, nor limited to shaft sections which are provided with flanges, but may be employed in other relations.

My improved mechanism comprises a support consisting of upper and lower relatively movable portions, as shown in Fig. 4. The lower portion of the support comprises a base 15 having an upright rectangular post or standard 16 thereon, in which are threadedly received a pair of screws 17. At its side edges the base 15 is slotted, as shown at 18, and upon each side of these slots the upper surface of the base is provided with half-round recesses 19 to receive semi-cylindrical nuts 20. The lower surface of the base may be of inverted V-shaped form, as at 21, so that, as shown in Fig. 3, when it rests upon a circular surface it will make a two-line contact therewith.

As previously stated, the nuts 20 are designed to rest in the recess 19, and passing loosely through these nuts are screws 22 having enlarged heads 23, which screws are threadedly received in sleeves 24 secured at each end of a sectional chain 25, which chain is adapted to embrace the flange 12 of the shaft 10, as shown in Figs. 1 and 3. It will be apparent that as the base 15 makes a two-line contact with the surface of the shaft it may be rigidly secured in place by adjusting the screws 22 in the sleeves 24. Considerable adjustment may be obtained due to the length of the threaded portion of the sleeves 24, it being noted that the slots 18 are sufficiently wide to receive the sleeves 24 if necessary. The chain 25 may preferably be formed in sections so that additional sections may be added or subtracted, if necessary, to obtain the proper length to embrace the shaft or shaft flange to which it is applied.

The upper portion of the support comprises a block 27 (Fig. 4), which block is provided with a rectangular recess 28 to slidably and snugly receive the post 16. Opening through the lower face of the block 27 are slots 29 adapted to receive the screws 17, the heads of these screws being received in countersunk recesses 30 so that by tightening the screws 17 the block 27 may be secured in any adjusted position upon the post 16 of the base 15. As shown in the drawings, this adjustment of the block 27 will be in a direction radial to the axis of the shaft 10, so that as will be hereinafter pointed out the stems or plungers of the dial indicators may be properly positioned with respect to the points on the surface of the other shaft section with which they are to be engaged.

As shown in Figs. 4 and 6, an adjusting screw 32 is threaded into the block 27 from the upper surface thereof, the lower end of this screw bearing against the upper surface of the base 15. When the screws 17 are loosened so as to permit the block 27 to slide freely upon the post 16, the adjusting screw 32 may be turned in one direction or the other. If threaded downwardly, it will engage the upper surface of the base 15 and raise the block 27 to the desired position. If threaded upwardly, it will permit the block to drop by gravity as permitted by the projection of the screw from the lower surface of the block 27, or by the engagement of the lower surface of the block with the upper surface of the base 15. When the adjustment has been completed, the screws 17 will be tightened to hold the block fixed in its adjusted position.

The block 27 is provided with two or more (two as shown in the drawings) through openings 34 to receive the supporting rods of the dial indicators, as will be hereinafter explained. The metal of the block 27 is provided with slots 35 extending from the lower surface of the block into the bores 34 so as to provide clamping jaws 36 which may be set up against the supporting rods of the indicators by set screws 37.

A rod 38 may be clamped in one of the openings 34, which rod carries the dial indicator 39, the stem or plunger 40 of which is engaged with the outer periphery of the flange 13, or if the shaft is not provided with a flange, this plunger would be engaged with the periphery of the shaft itself. In the other opening 34 is clamped a rod 41 which is adapted to support the dial indicator 42 at a greater distance from the block 27 than is the indicator 39. As shown in the drawings, if the rod 41 is not sufficiently long, a clamping block 44 may be secured to this rod. This clamping block is provided with openings 45 to receive the rod 41 and also to receive a rod 46 secured to the dial indicator 42. As shown, the block 44 is split through as at 47 so that the rods 41 and 46 may be clamped in the openings 45 by the clamping screws 48.

As shown in Figs. 1 and 3, the plunger 40 of the indicator 39 engages directly the surface of the flange or shaft. However, the plunger 49 of the dial indicator 42 engages a bell-crank lever 51 pivoted at 52 to a clamp member 53 secured upon the housing of the indicator, the bell-crank lever 51 having a contact member 54 to engage the rear face of the flange 13.

As the supporting member which holds the rods 38 and 41 is secured to the flange 12 of one of the shafts, it will be seen that the bell-crank lever 51 will cause the dial 42 to register any separating or approaching movements of one shaft with the other as they are rotated. The rods 38 and 41 permit adjustment of the distance of the indicators 39 and 42 from the supporting block 27, and also permit angular adjustment of the indicators. Also the use of the auxiliary block 44 permits an additional range of adjustment of the indicators from the support, and it may also be noted that the block 44 may be adjusted rotatably on the rod 41, and also the rods 38 and 46 adjusted rotatably in the blocks 27 and 44, thus setting the indicators at any desired angle.

When the device is in place with the adjustments made so that the indicators bear against the periphery of one flange and against an end wall of that flange, the dials are usually so adjusted as to permit turning of the hands of the indicators in either direction. Then both shaft sections are turned and readings taken every 90°. As the shaft sections are rotated together, the indicator plungers will always contact the same points on the flange and thus any error due to irregularity in the flange itself will be eliminated. Corrections are then made as indicated by the readings. That is, if the axis of one shaft is lower than the other, the frame carrying the lower shaft may be raised, for example, or the other may be lowered by removal of shims until the shafts are properly aligned vertically. If there is a horizontal misalignment, the frame of the machine which carries one of the shafts may be moved with respect to its base. In a similar manner, any angular misalignment of the shafts may also be corrected.

If the shafts to be aligned are not provided with flanges, the base 15 of the support may be secured directly to one of the members and the bell crank lever 51 rotated with respect to the gauge so that it may engage the front face of the other shaft section. The plunger 40 of the indicator 39 will engage the periphery of the shaft itself instead of the periphery of the flange.

While I have shown and described a preferred embodiment of my invention, it will be understood that it is not to be limited to all of the details shown, but is capable of modification and variation within the spirit of the invention and within the scope of the claims.

What I claim is:

1. Shaft-aligning mechanism comprising a base having its lower side of inverted V-shaped form to make spaced line contacts with the curved surface of a shaft member, said base having an upstanding post of polygonal shape thereon, a block having a recess intermediate its ends to slidably receive said post to support the block adjustably on the base, said recess being of a shape to complement that of the post, said block having slots opening through the lower face thereof, set screws threaded into the post and received in said slots, means for securing said base to the shaft member, and gauge supporting means carried by said block.

2. Shaft-aligning mechanism comprising a base having its lower side of inverted V-shaped form to make spaced line contacts with the curved surface of a shaft member, said base having an upstanding post of polygonal shape thereon, a block having a recess intermediate its ends to slidably receive said post to support the block adjustably on the base, said recess being of a shape to complement that of the post, said block having slots opening through the lower face thereof, set screws threaded into the post and received in said slots, an adjusting screw threaded into the block from the top thereof, the lower end of which screw engages the base, means for securing said base to the shaft member, and gauge supporting means carried by said block.

3. Shaft-aligning mechanism comprising a base having its lower side of inverted V-shaped form to make spaced line contacts with the curved surface of a shaft member, said base having an upstanding post of polygonal shape thereon, a block having a recess intermediate its ends to slidably receive said post to support the block adjustably on the base, said recess being of a shape to complement that of the post, said block having slots opening through the lower face thereof, set screws threaded into the post and received in said slots, said block having a transverse opening therein, a gauge supporting rod member slidably received in said opening, and the body of said block being provided with an open ended slot leading into said opening whereby the walls of the slot may be drawn together to clamp said rod member in place, and means for securing said base to the shaft.

4. Shaft-aligning mechanism comprising a base having its lower side of inverted V-shaped form to make spaced line contacts with the curved surface of a shaft member, said base having an upstanding post of polygonal shape thereon, a block having a recess intermediate its ends to slidably receive said post to support the block adjustably on the base, said recess being of a shape to complement that of the post, said block having slots opening through the lower face thereof, set screws threaded into the post and received in said slots, said block having a transverse opening at each side of said recess, a gauge supporting rod member received in each of said openings, and the body of the block being provided with open ended slots leading into said openings, and screw members threaded into the walls of the slots to draw the same together and clamp the rod members in said openings.

ROBERT VOSS.

References Cited in the file of this patent

UNITED STATES PATENTS

| Number | Name | Date |
|---|---|---|
| 437,225 | McDuff et al. | Sept. 30, 1890 |
| 1,221,507 | Buesse | Apr. 3, 1917 |
| 1,231,479 | Blumer | June 26, 1917 |
| 2,105,502 | Pointer | Jan. 18, 1938 |
| 2,108,077 | Robinson | Feb. 15, 1938 |
| 2,324,379 | Foster | July 13, 1943 |
| 2,371,451 | Larson | Mar. 13, 1945 |
| 2,375,448 | Talbot et al. | May 8, 1945 |
| 2,469,874 | Fetsko, Jr. | May 10, 1949 |

FOREIGN PATENTS

| Number | Country | Date |
|---|---|---|
| 12,582 | Great Britain | May 21, 1897 |
| 547,581 | Great Britain | Sept. 2, 1942 |
| 566,250 | Germany | Dec. 13, 1932 |